(12) United States Patent
D'Acquisto

(10) Patent No.: US 12,496,495 B2
(45) Date of Patent: Dec. 16, 2025

(54) CLIMBING STICKS

(71) Applicant: Andrae D'Acquisto, Bellevue, IA (US)

(72) Inventor: Andrae D'Acquisto, Bellevue, IA (US)

( * ) Notice: Subject to any disclaimer, the term of this patent is extended or adjusted under 35 U.S.C. 154(b) by 711 days.

(21) Appl. No.: 17/803,490

(22) Filed: Aug. 4, 2022

(65) Prior Publication Data

US 2023/0241458 A1 Aug. 3, 2023

Related U.S. Application Data

(60) Provisional application No. 63/259,747, filed on Aug. 6, 2021.

(51) Int. Cl.
*A63B 27/00* (2006.01)
*A01M 31/02* (2006.01)

(52) U.S. Cl.
CPC ............. *A63B 27/00* (2013.01); *A01M 31/02* (2013.01)

(58) Field of Classification Search
CPC ........ A63B 27/00; A01M 31/02; E06C 1/381; E06C 1/34
USPC .......................................... 182/93, 100, 189
See application file for complete search history.

(56) References Cited

U.S. PATENT DOCUMENTS

| | | | |
|---|---|---|---|
| 646,291 A * | 3/1900 | Krueger | E06C 1/381 182/189 |
| 4,432,436 A * | 2/1984 | Suiter | E06C 5/02 182/189 |
| 6,547,035 B1 | 4/2003 | D+3 Acquisto | |
| 7,163,083 B2 | 1/2007 | Argoud | |
| 8,556,035 B1 | 10/2013 | Kendall | |
| 9,732,556 B2 | 8/2017 | Priest | |
| 10,301,873 B2 | 5/2019 | Priest | |
| 10,582,704 B2 | 3/2020 | Wheelington | |
| 10,798,937 B2 | 10/2020 | Berry | |
| 10,973,224 B2 | 4/2021 | Infalt | |
| D943,117 S | 2/2022 | D'Acquisto | |
| 2005/0230186 A1 | 10/2005 | Bigard | |
| 2012/0125715 A1* | 5/2012 | Furseth | E06C 7/081 72/253.1 |
| 2016/0069133 A1* | 3/2016 | Priest | E06C 1/387 182/189 |
| 2016/0265276 A1 | 9/2016 | Hartman | |
| 2018/0228142 A1* | 8/2018 | Connor | E06C 1/381 |
| 2019/0055782 A1* | 2/2019 | Infalt | E06C 1/34 |
| 2020/0253190 A1 | 8/2020 | D'Acquisto | |
| 2021/0205667 A1 | 7/2021 | Garis | |
| 2022/0333442 A1* | 10/2022 | Sirlin, III | E06C 1/387 |

* cited by examiner

*Primary Examiner* — Brian E Glessner

(57) ABSTRACT

The invention relates to improved climbing sticks for use in climbing trees for hunting or other purposes. The climbing sticks includes a center support beam having a pair of support brackets mounted at the top and bottom ends of the support beam configured to engage a tree on which the climbing stick is placed and a releasable securing arrangement for securing the climbing stick about the tree. The climbing stick of the invention is characterized by comprising at least two pairs of steps rotatably mounted to the support beam at the top, center, and/or bottom of the support beam opposite the support brackets. The pair of steps can either be rotated in opposite directions or they can both be rotated in the same direction.

7 Claims, 5 Drawing Sheets

CLIMBING STICKS

FIELD OF THE INVENTION

The invention relates to improved climbing sticks, also referred to as ladder modules, for use in climbing trees for hunting or other purposes.

DETAILED DESCRIPTION OF THE INVENTION

The invention relates to improved climbing sticks for use in climbing trees for hunting or other purposes. The climbing sticks includes a center support beam having a pair of support brackets mounted at the top and bottom ends of the support beam. The brackets are generally V-shaped and include a number of teeth on the interior surface of the bracket that engage the tree on which the module is placed to prevent the module from slipping on the tree. These brackets that grip the tree when climbing pivot 360% allowing them to become flush with the body of the stick to minimize profile and to allow the sticks to nest closely together so that they can be easily carried/secured to the treestand of the invention.

The climbing sticks also include a releasable securing arrangement for securing the climbing stick about the tree. The arrangement comprises a belt having a buckle and a pair of straps removably engagable with a fastener mounted to the support member on the side of the support member opposite the support brackets. The configuration of the securing arrangement allows the belt to be selectively and releasably positioned on the support member to avoid any interference with the belt by limbs or branches extending from the tree. The climbing stick also comprises at least two pairs of steps rotatably mounted to the support beam at the top, center, and/or bottom of the support beam opposite the support brackets. Each step includes a pair of annular shoulders on either side of the step that are engagable with a stop that is directly fabricated into the support member, allowing the step to provide a stable, horizontal stepping surface when rotated to either side of the support member. The pair of steps can either be rotated in opposite directions as shown in FIG. 1 or they can both be rotated in the same direction as shown in FIG. 2.

Each climbing sticks is equipped with plug style grommets to allow sticks to fit snugly to each other together for transport. These plugs are also designed to fit into carrying ports that can be fabricated at pre-determined locations on the treestand platform.

The support beam can be fabricated from a solid piece of metal, e.g., aluminum that has been appropriately strengthened, or of hollow tubular design. In one embodiment the center support beam is fabricated from a solid piece of strengthened aluminum. In this embodiment, the beam can optionally comprise hand grips cut right into the support member allowing for better grip when climbing. In another embodiment, the support beam is not straight it jogs for added concealment and profile break up when in tree. Patterns and true edges are very unnatural in nature. The cutout designs cut out of support member of the sticks of the invention have no consecutive pattern to better blend in the wilderness.

The rope or strap for attachment to the tree comes through the stick from back to front allowing you the option of going around the tree in either direction opposed to the rope coming out of one side. Optionally, the rope attachment anchor can be built into upright section of stick for streamline attachment, or traditional attachment means can be used. The attachment anchor serves as a wedge for rope attachment opposed to dual cam mechanisms.

In its broadest embodiment the solid center support beam of the climbing stick of the invention can be made of by any process, including machining from a solid metal workpiece, including aluminum and the like, and/or by a cast aluminum process. Any form of aluminum, aluminum alloy, or other metal/metal alloy can be used to fabricate the treestands of the invention provided that they are sufficient strength and not excessively heavy.

One option to obtain a lighter climbing stick is to use a non-casted, support structure machined from one-piece plate stock. This machining process solid allows one to fabricate solid center support beams or structures from a single piece of aluminum stock that are much lighter and stronger than traditional support structures. In one embodiment of the invention the center support beam of the climbing stick of the invention is fabricated from a single aluminum workpiece by a waterjet process, optionally an abrasive waterjet process. Fabricating a solid one-piece center support structure with an abrasive water jet process allows one to make support structures that are even stronger and lighter than structures machined from one piece of plate stock. Utilizing a waterjet process allows one to reduce the wall thicknesses and still achieve the strength needed. Accordingly, the support structures of the present ladder modules of the invention made by waterjet process are among the strongest and lightest in the industry. Additionally, they are quieter and stealthier than prior art support structures that are generally of hollow tubular design.

In another embodiment, the center support beam of the climbing stick of the invention is of hollow tubular design.

The individual climbing sticks have a simple construction comprised of a number of pairs of steps secured to center support structure. The pairs of steps are pivotably mounted to the support beam, allowing the steps to rotate from a closed, vertical position when the module is in transport or is not in use, to an open, horizontal position where the each step points outward perpendicular to the support member in opposite directions to provide double step stepping surface. Alternatively, the pair of steps can be rotated in the same direction providing the user with a broader stepping surface.

Each climbing stick is secured to the tree trunk by a securing belt attached at one end by a bolt to one side of the support member. The belt is releasably secured at its opposite end to a belt hook or fastener attached to the center support member opposite the belt.

The climbing stick is supported on the tree by a pair of stabilizing brackets located at the upper and lower ends of the support member. The brackets engage the trunk of the tree to prevent the ladder module from sliding downwardly along the trunk while supporting an individual. The brackets are rotatably mounted to each end of the support member to allow each bracket to independently conform to the direction in which the tree trunk extends. The brackets that grip the tree when climbing can pivot up to 180°, in another embodiment 360° allowing them to become flush with the body or beam of the stick to minimize profile and to allow the sticks to nest closely together so that they can be easily carried/secured to a treestand.

The improved ladder module/climbing stick is specially adapted to form a modular ladder for climbing a tree to position and/or reach a tree stand. The module comprises at least two pairs of steps rotatably connected to an elongate, solid center support structure or beam. The steps have an arrowhead-like shape and are spaced from each other along the length of the support member to form an upper step, an optional middle step depending on the length of the center support beam, and a lower step. Longer sticks having a longer center support structure may require three or more pairs of steps; shorter sticks may require only two pairs of steps, i.e., an upper pair and a lower pair of steps. The steps are rotatably mounted on a support member and are capable of rotating in either direction with respect to the support member to provide a grooved, non-slip stepping surface on either side of the support member. Each step in the step pair can be rotated in opposite directions to provide a double step stepping platform or in the same direction to provide a wider stepping platform at the discretion of the user.

Each step includes a grooved stepping surface disposed on both long sides of each step that allow the steps to provide a non-slip stepping surface when rotated to either side of the support member. Also, on both sides of the point of attachment of each step to the support member are located a pair of annular shoulders, capable of restricting the rotation of each step with respect to the support member. Each shoulder engages a stop located beneath the step to selectively position the step outwardly on either side of the support member. Unlike prior art climbing steps, the stop of the steps of the invention are optionally fabricated directly into the solid, one-piece center support structure. This improved step/stop construction allows the ladder module of the present invention minimizes parts that ordinarily would need to be installed/fastened to the center support structure. Alternatively, in embodiments with the hollow tube design center support beam, the stop can be a bolt head or similar structure that is capable of engaging the shoulder of the rotatable step. Finally, the climbing sticks of the invention can be used in situations where prior art ladder modules could not be used by providing steps that may be rotated in either direction of in the same direction on the support member to avoid any limbs or branches that may obstruct the rotation of the step in one direction.

The improved climbing stick or ladder module of the present invention comprises a securing arrangement attached to the center support member used to secure the module to the tree. The arrangement includes a belt fastener disposed on the support member between the upper step and the middle step. In one embodiment the fastener is comprised of a stem extending outwardly from the support member and a radially extending flange attached to the stem opposite the support member that covers the stem. The flange provides an attachment point for a belt forming the remaining portion of the improved securing arrangement utilized with the ladder module. The belt is comprised of a pair of straps, each including a loop at one end. The loops on each strap are placed over the flange of the fastener to secure the loops to the fastener on the support member. One of the straps includes an adjustable buckle attached to the strap opposite the loop that engages the non-loop end of the remaining strap to releasably secure the belt about the trunk of the tree. The loop and fastener arrangement of the present invention allows the securing belt to be secured about the tree trunk with the buckle positioned on either side of the support member, so that the buckle may be selectively positioned to avoid any limbs, branches or other obstructions that may prevent the securing belt from performing properly. This securing arrangement is also able to be used on other devices utilized by hunters that are secured to a tree, such as tree stands.

DETAILED DESCRIPTION OF THE INVENTION

The invention relates to improved climbing sticks for use in climbing trees for hunting or other purposes. The climbing sticks includes a center support beam having a pair of support brackets mounted at the top and bottom ends of the support beam. The brackets are generally V-shaped and include a number of teeth on the interior surface of the bracket that engage the tree on which the module is placed to prevent the module from slipping on the tree. These brackets that grip the tree when climbing pivot 360° allowing them to become flush with the body of the stick to minimize profile and to allow the sticks to nest closely together so that they can be easily carried/secured to the treestand of the invention.

Figure 1:
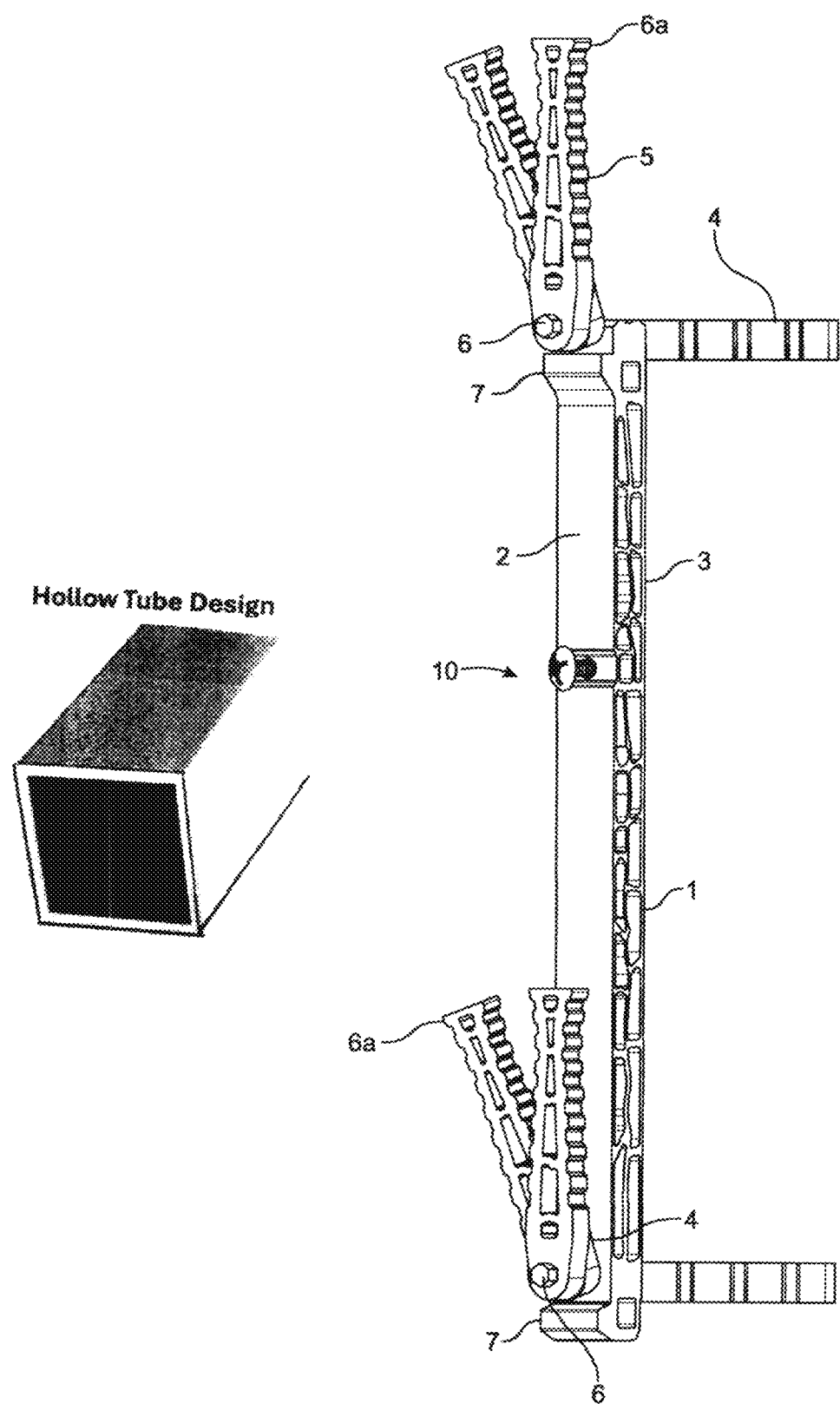
FIG. 1 is a top view illustrating the module ladder of the present invention.
Figure 2:
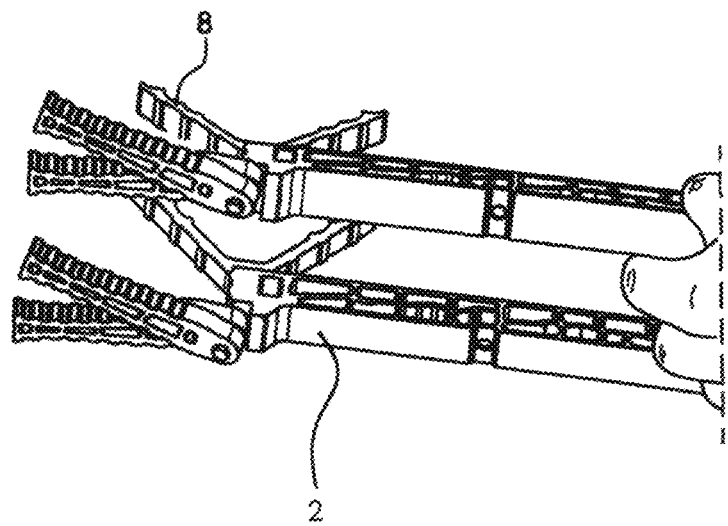
FIG. 2 shows how the pairs of steps can be rotated in opposite directions or in the same direction.

The climbing sticks also include a releasable securing arrangement for securing the climbing stick about the tree. The arrangement comprises a belt having a buckle and a pair of straps removably engagable with a fastener mounted to the support member on the side of the support member opposite the support brackets. The configuration of the securing arrangement allows the belt to be selectively and releasably positioned on the support member to avoid any interference with the belt by limbs or branches extending from the tree. The climbing stick also comprises at least two pairs of steps rotatably mounted to the support beam at the top, center, and/or bottom of the support beam opposite the support brackets. Each step includes a pair of annular shoulders on either side of the step that are engagable with a stop that is directly fabricated into the support member, allowing the step to provide a stable, horizontal stepping surface when rotated to either side of the support member. The pair of steps can either be rotated in opposite directions as shown in FIG. 1 or they can both be rotated in the same direction as shown in FIG. 2.

Each climbing sticks is equipped with plug style grommets to allow sticks to fit snugly to each other together for transport. These plugs are also designed to fit into carrying ports that can be fabricated at pre-determined locations on the treestand platform.

The support beam can be fabricated from a solid piece of metal, e.g., aluminum that has been appropriately strengthened, or of hollow tubular design. In one embodiment the center support beam is fabricated from a solid piece of strengthened aluminum. In this embodiment, the beam can optionally comprise hand grips cut right into the support member allowing for better grip when climbing. In another embodiment, the support beam is not straight it jogs for added concealment and profile break up when in tree. Patterns and true edges are very unnatural in nature. The cutout designs cut out of support member of the sticks of the invention have no consecutive pattern to better blend in the wilderness.

The rope or strap for attachment to the tree comes through the stick from back to front allowing you the option of going around the tree in either direction opposed to the rope coming out of one side. Optionally, the rope attachment anchor can be built into upright section of stick for streamline attachment, or traditional attachment means can be used. The attachment anchor serves as a wedge for rope attachment opposed to dual cam mechanisms.

In its broadest embodiment the solid center support beam of the climbing stick of the invention can be made of by any process, including machining from a solid metal workpiece, including aluminum and the like, and/or by a cast aluminum process. Any form of aluminum, aluminum alloy, or other metal/metal alloy can be used to fabricate the treestands of the invention provided that they are sufficient strength and not excessively heavy.

One option to obtain a lighter climbing stick is to use a non-casted, support structure machined from one-piece plate stock. This machining process solid allows one to fabricate solid center support beams or structures from a single piece of aluminum stock that are much lighter and stronger than traditional support structures. In one embodiment of the invention the center support beam of the climbing stick of the invention is fabricated from a single aluminum workpiece by a waterjet process, optionally an abrasive waterjet process. Fabricating a solid one-piece center support structure with an abrasive water jet process allows one to make support structures that are even stronger and lighter than structures machined from one piece of plate stock. Utilizing a waterjet process allows one to reduce the wall thicknesses and still achieve the strength needed. Accordingly, the support structures of the present ladder modules of the invention made by waterjet process are among the strongest and lightest in the industry. Additionally, they are quieter and stealthier than prior art support structures that are generally of hollow tubular design.

In another embodiment, the center support beam of the climbing stick of the invention is of hollow tubular design.

The individual climbing sticks have a simple construction comprised of a number of pairs of steps secured to center support structure. The pairs of steps are pivotably mounted to the support beam, allowing the steps to rotate from a closed, vertical position when the module is in transport or is not in use, to an open, horizontal position where the each step points outward perpendicular to the support member in opposite directions to provide double step stepping surface. Alternatively, the pair of steps can be rotated in the same direction providing the user with a broader stepping surface.

Each climbing stick is secured to the tree trunk by a securing belt attached at one end by a bolt to one side of the support member. The belt is releasably secured at its opposite end to a belt hook or fastener attached to the center support member opposite the belt.

The climbing stick is supported on the tree by a pair of stabilizing brackets located at the upper and lower ends of the support member. The brackets engage the trunk of the tree to prevent the ladder module from sliding downwardly along the trunk while supporting an individual. The brackets are rotatably mounted to each end of the support member to allow each bracket to independently conform to the direction in which the tree trunk extends. The brackets that grip the tree when climbing can pivot up to 180°, in another embodiment 360° allowing them to become flush with the body or beam of the stick to minimize profile and to allow the sticks to nest closely together so that they can be easily carried/secured to a treestand.

The improved ladder module/climbing stick is specially adapted to form a modular ladder for climbing a tree to position and/or reach a tree stand. The module comprises at least two pairs of steps rotatably connected to an elongate, solid center support structure or beam. The steps have an arrowhead-like shape and are spaced from each other along the length of the support member to form an upper step, an optional middle step depending on the length of the center support beam, and a lower step. Longer sticks having a longer center support structure may require three or more pairs of steps; shorter sticks may require only two pairs of steps, i.e., an upper pair and a lower pair of steps. The steps are rotatably mounted on a support member and are capable of rotating in either direction with respect to the support member to provide a grooved, nonslip stepping surface on either side of the support member. Each step in the step pair can be rotated in opposite directions to provide a double step stepping platform or in the same direction to provide a wider stepping platform at the discretion of the user.

Each step includes a grooved stepping surface disposed on both long sides of each step that allow the steps to provide a non-slip stepping surface when rotated to either side of the support member. Also, on both sides of the point of attachment of each step to the support member are located a pair of annular shoulders, capable of restricting the rotation of each step with respect to the support member. Each shoulder engages a stop located beneath the step to selectively position the step outwardly on either side of the support member. Unlike prior art climbing steps, the stop of the steps of the invention are optionally fabricated directly into the solid, one-piece center support structure. This improved step/stop construction allows the ladder module of the present invention minimizes parts that ordinarily would need to be installed/fastened to the center support structure. Alternatively, in embodiments with the hollow tube design center support beam, the stop can be a bolt head or similar structure that is capable of engaging the shoulder of the rotatable step. Finally, the climbing sticks of the invention can be used in situations where prior art ladder modules could not be used by providing steps that may be rotated in either direction of in the same direction on the support member to avoid any limbs or branches that may obstruct the rotation of the step in one direction.

The improved climbing stick or ladder module of the present invention comprises a securing arrangement attached to the center support member used to secure the module to the tree. The arrangement includes a belt fastener disposed on the support member between the upper step and the middle step. In one embodiment the fastener is comprised of a stem extending outwardly from the support member and a radially extending flange attached to the stem opposite the support member that covers the stem. The flange provides an attachment point for a belt forming the remaining portion of the improved securing arrangement utilized with the ladder module. The belt is comprised of a pair of straps, each including a loop at one end. The loops on each strap are placed over the flange of the fastener to secure the loops to the fastener on the support member. One of the straps includes an adjustable buckle attached to the strap opposite the loop that engages the non-loop end of the remaining strap to releasably secure the belt about the trunk of the tree. The loop and fastener arrangement of the present invention allows the securing belt to be secured about the tree trunk with the buckle positioned on either side of the support member, so that the buckle may be selectively positioned to avoid any limbs, branches or other obstructions that may prevent the securing belt from performing properly. This securing arrangement is also able to be used on other devices utilized by hunters that are secured to a tree, such as tree stands.

Figure 5:
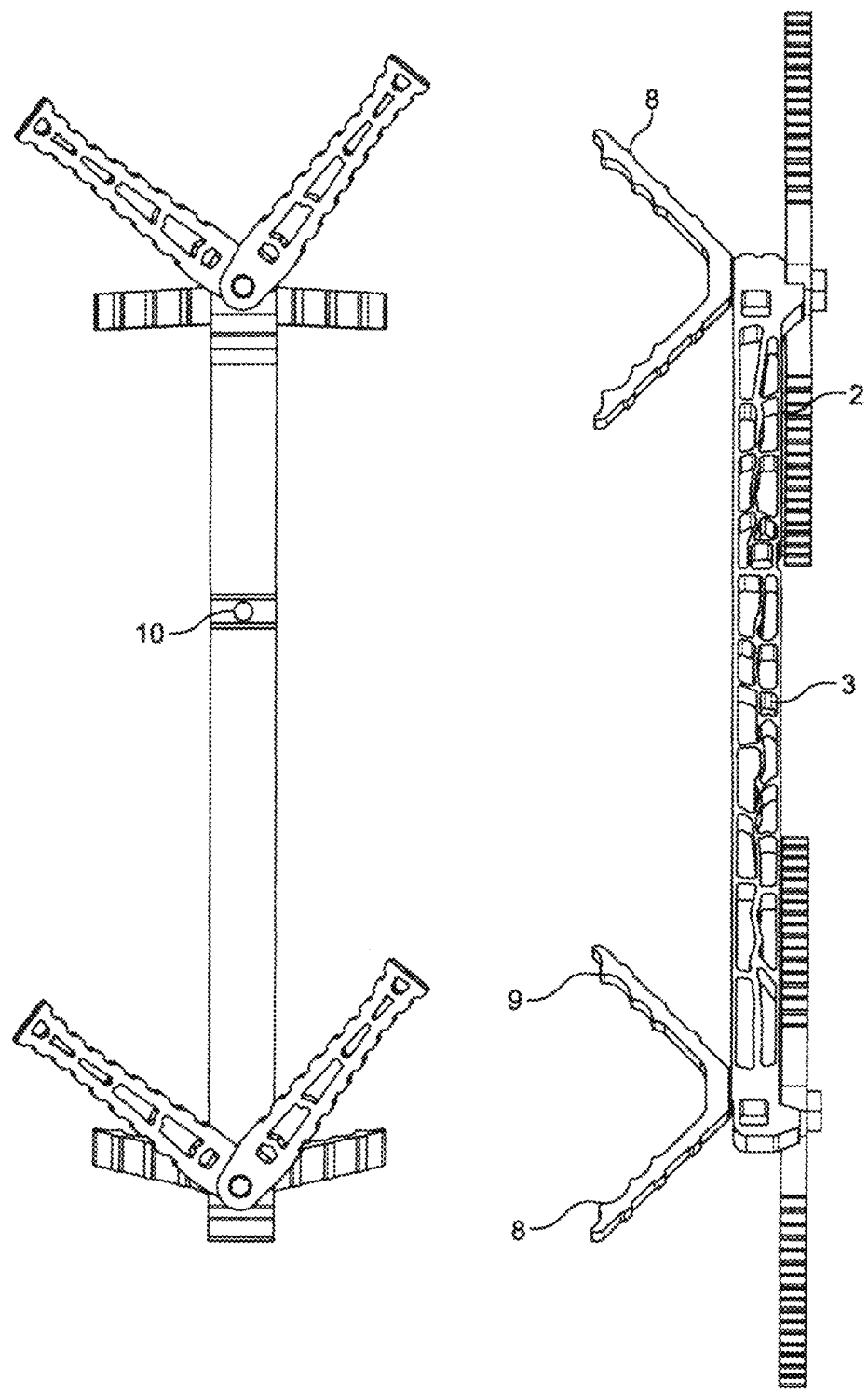
FIG. 5 illustrates the plug style grommets of the ladder module.
Figure 6:
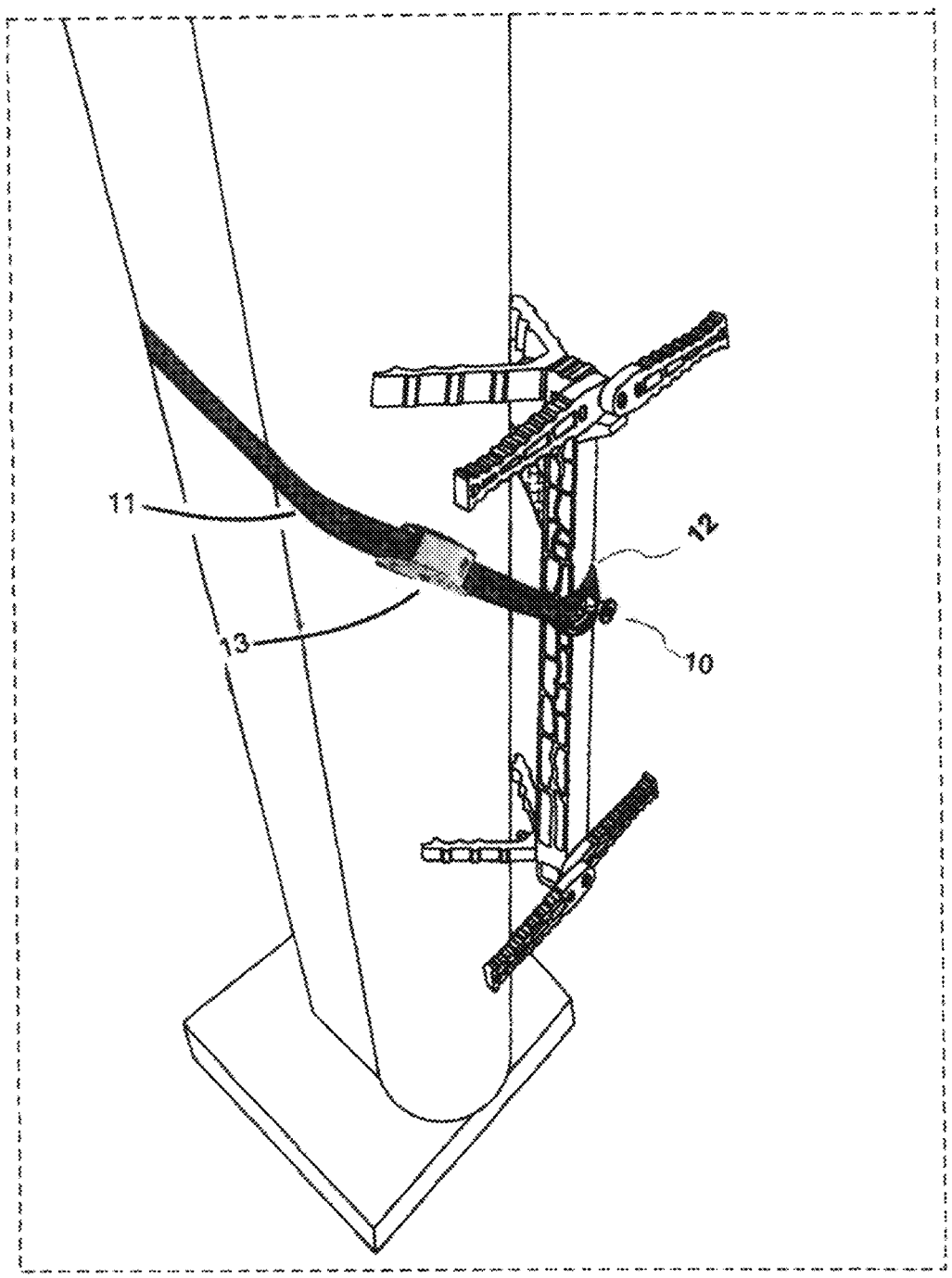
FIG. 6 shows a top view and a side view of the ladder modules of the invention.

Referring to FIG. 1, the climbing stick 1 includes a solid elongate support structure, beam or member 2 that functions as the body of the climbing stick 1. The support member 2 optionally comprises hand grips cut right into the support member allowing for better grip when climbing. In one embodiment, the support member is not straight, it jogs for added concealment and profile break up when in tree. Patterns and true edges are very unnatural in nature. The cutout designs 3 cut out of support member of the sticks of the invention have no consecutive pattern to better blend in the wilderness. The cutout pattern 3 is best shown in FIG. 5.

Support member 2 also includes pairs of steps 5 formed of a lightweight metal, preferably aluminum, that are spaced along one side of the support member 2. Each step 5 is rotatably mounted to the support member 2 to provide a stepping surface for an individual using the ladder module 1. In one embodiment, the steps 5 are mounted to the support member 2 near the top end, bottom end, and at the center of the support member 2. As best shown in FIG. 1 the step pairs 5 are generally triangular in shape having a pair of elongated stepping portions connected to each other at one end, forming a pointed end, and to opposite ends of a connecting portion opposite the pointed end. This configuration allows each step pair 5 to provide a stepping surface on each stepping portion when the steps 5 are rotated on opposite sides or on the same side of the support member 2. To aid an individual using the steps 5 on support member 2 to climb the tree, each stepping portion includes a number of grooves spaced along its length. The grooves provide traction for the foot of the individual utilizing the step 5 to help prevent the foot from slipping off the stepping portion of the step 5.

Each step pair 5 is rotatably connected to the support member 2 by a bolt 6 inserted through an opening in the center of the support member. The bolt 6 extends through an aligned opening passing through support member 2 and is secured therein by a nut threadably mounted onto the bolt 6 on the side of support member 2 opposite the step 5. To facilitate the movement of each step 5 with respect to the support member 2, a washer formed of a low friction material is preferably disposed between the step 5 and support member 2 around bolt 6.

Figure 3:
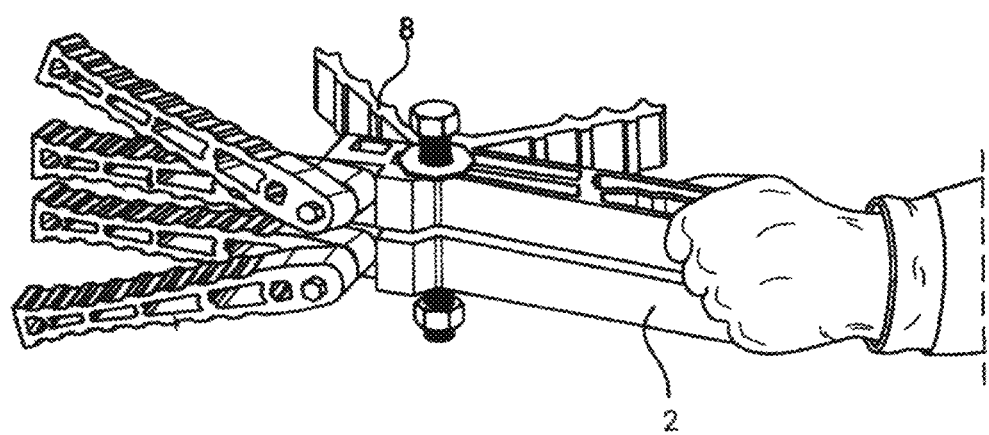
FIG. 3 and FIG. 4 illustrate how the sticks of the invention nest closely one to the other.
Figure 4:
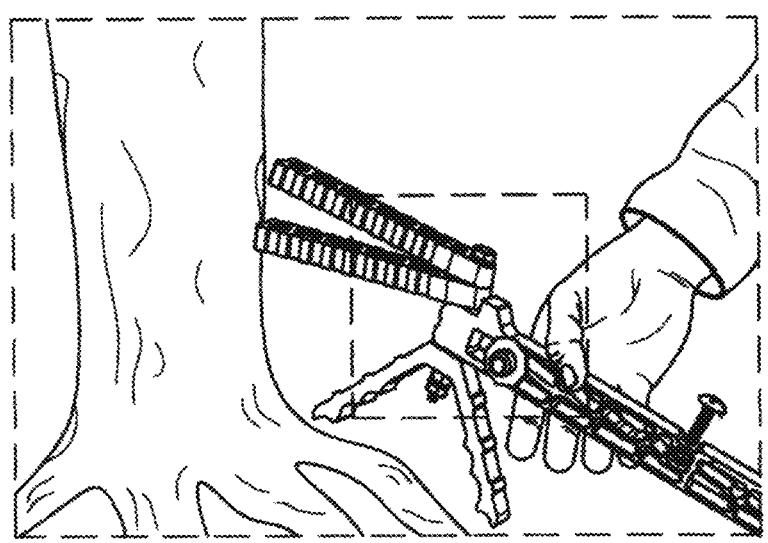

Each step 5 also includes a pair of curved shoulders 6a disposed in opposite ends of connecting portion, as best shown in FIG. 3. When the step 5 is rotated in either direction on support member 2, one of the annular shoulders 4 contacts a stop 7 positioned directly beneath the step 5 on support member 2. Each annular shoulder 4 engages the stop 7 to laterally position the step 5 such that each stepping portion provides a horizontal stepping surface on one side of the support member 2, depending upon the side of support member 2 to which the step 5 has been rotated. The stop 7 can fabricated directly in the solid center support member, or if a hollow tube is employed as the center support structure it can be a bolt or similar structure.

Referring now to FIG. 5, the support member 2 also includes a pair of support brackets 8 mounted adjacent the top end and bottom end of the support member 2. The brackets 8 are generally V-shaped, including an interior surface and an exterior surface. As illustrated by FIG. 5, the brackets 8 are rotatably mounted to each end of the support member to allow each bracket 8 to independently conform to the direction in which the tree trunk extends. The brackets 8 that grip the tree when climbing pivot 180°, in another embodiment 360° allowing them to become flush with the body of the stick to minimize profile and to allow the sticks to nest closely together so that they can be easily carried/secured to the treestand of the invention.

The brackets 8 also include a number of teeth 9 spaced along the length of each side of bracket that are generally triangular in shape having a point extending outwardly from the interior surface of bracket 8. The teeth 9 on bracket 8 engage the trunk of the tree to prevent the climbing stick 1 from sliding down the tree when a person is climbing a tree puts his/her weight on the climbing stick.

Referring now to FIG. 5, the support member 2 also has a securing arrangement to hold the climbing stick on tree. A fastener 10 is secured to the support member 2 between the steps 5. The fastener 10 includes a cylindrical mounting sleeve extending outwardly from the support member 2 and a circular retaining flange positioned on the mounting sleeve opposite the support member 2. The flange is preferably a metal washer having a diameter significantly greater than the sleeve and including a hole in the center of the flange. The sleeve and flange are secured to the support member 2 by a bolt inserted into the support member 2 through the hole in flange and through sleeve. The bolt extends through the support member 2 and is secured to the support member 2 opposite the fastener by a nut. The fastener 10 provides a point on the support member 2 used to removably attach each end of a securing belt to the support member 2 in order to reliably secure the module 1 to the tree. In another embodiment, the center support structure is fabricated from a single piece of strengthened metal and the fastener 10 is fabricated directly from the center support structure 2.

The belt is comprised of a securing strap 11, a buckle strap 12, and a releasable buckle 13. The securing strap 11 is an elongate strap of a durable material, such as nylon, that includes a free end and a loop integrally formed in the strap opposite the free end. The securing strap 11 is removably attached to the fastener 10 by placing the loop around the retaining flange of fastener. The flange prevents the loop from disengaging from the fastener 10, maintaining the securing strap 11 in attachment, with the support member 2.

The buckle strap 12 is formed of the same material as the securing strap 11 and also includes a loop at one end that is also removably attached to the fastener 10. However, the end of buckle strap 12 opposite the loop is attached to the buckle 13, which is placed around the tree to receive the free end of securing strap 12 to secure the ladder module 1 on the tree.

To attach the module 1 to a selected tree, first, the securing strap 11 and buckle strap 12 are secured to the fastener 10 on support member 2 so that the securing arrangement and, namely, the buckle 13 on buckle strap 12, will not be obstructed by any limbs extending from the tree. Next, the brackets 8 are positioned against the center of the tree to position the support member 2 in a generally vertical direction on the tree. The brackets 8 may be rotated with respect to the support member 2 to conform to the shape of the tree. Then, the straps of the securing belt 11 and buckle strap 12 are wrapped around the tree in opposite directions, and the free end of securing strap 11 is inserted through the releasable buckle 13. The securing strap 11 is pulled tight through buckle 13 to securely fasten the securing belt about the tree. Finally, each step 5 is rotated with respect to support member 2 to extend one of the stepping portions on step 5 to provide a horizontal stepping surface where desired on one side of the support member 2.

Various modes of carrying out the present invention are contemplated as being within the scope of the following claims particularly pointing out and distinctly claiming the subject matter which is regarded as the invention.

I claim:

1. A climbing stick releasably securable to a tree, the stick comprising: a) a center support structure; b) a fastener projecting outwardly from the surface of said center support structure; c) at least two pairs of steps rotatably mounted to the center support structure wherein each pair of steps comprises a first and a second step and d) a stop on said center support structure for each pair of steps, said stop projecting outwardly from the center support structure in the same direction as the fastener; wherein said at least two pairs of steps are each engageable with the stop, wherein each step in the pair of steps is movable between a first position where each step is configured to engage the stop and the steps are positioned generally perpendicular to the center support structure in a first direction, a second position where the first and second steps are each positioned generally parallel to the center support structure, and a third position wherein the first and second steps are configured to engage the stop and the steps are positioned generally perpendicular to the center support structure and in a direction opposite the first direction.

2. The climbing stick of claim 1 wherein said center support structure is a solid metal structure fabricated from a single piece of strengthened metal, or is of hollow tubular design.

3. The climbing stick of claim 2 where said center support structure is a solid metal structure fabricated from a single piece of strengthened metal wherein cutout designs are milled, machined and/or water jetted out of the center support structure.

4. The climbing stick of claim 3 wherein said solid center support structure is fabricated from solid aluminum stock via a waterjet process.

5. The climbing stick of claim 1 further comprising: a) a buckle strap having a first loop at one end that is releasably engageable with the fastener member (10) and a releasable buckle (13) attached to the opposite end; and b) a securing strap (11) having a second loop at one end that is releasably engageable with the fastener (10) and a free end opposite the loop that is releasably engageable with the buckle (13).

6. The climbing step of claim 1 wherein each step of the at least two pairs of steps can be rotated in opposite directions or in the same direction providing one or two stepping surfaces.

7. The climbing step of claim 1 wherein the at least two pairs of steps are spaced from each other along the length of the center support structure to form an upper step, an optional middle step depending on the length of the center support beam, and a lower step.

* * * * *